United States Patent [19]

Carmillet et al.

[11] Patent Number: 4,655,337
[45] Date of Patent: Apr. 7, 1987

[54] TORSIONAL DAMPER DEVICE

[75] Inventors: Roger Carmillet, Birmingham, Mich.; Michel Graton, Paris; Michel Bacher, Domont, both of France

[73] Assignee: VALEO, Paris, France

[21] Appl. No.: 761,518

[22] Filed: Aug. 1, 1985

[30] Foreign Application Priority Data

Aug. 3, 1984 [FR] France ................ 84 12291

[51] Int. Cl.[4] ............ F16D 3/66; F16D 3/14
[52] U.S. Cl. ............... 192/106.2; 192/70.17; 464/68
[58] Field of Search ......... 192/106.2, 106.1, 70.18, 192/70.17; 464/68, 64

[56] References Cited

U.S. PATENT DOCUMENTS

| 4,212,380 | 7/1980 | Billet | 192/106.2 |
| 4,485,907 | 12/1984 | Nishimura | 192/106.2 |
| 4,588,062 | 5/1986 | Caray et al. | 192/106.2 |

FOREIGN PATENT DOCUMENTS

| 2270491 | 3/1977 | France . |
| 2540583 | 8/1984 | France . |
| 1200013 | 7/1970 | United Kingdom . |
| 2083592 | 3/1982 | United Kingdom . |

*Primary Examiner*—George H. Krizmanich
*Attorney, Agent, or Firm*—Charles E. Brown; Charles A. Brown

[57] ABSTRACT

A torsional damper device comprises at least three coaxial parts rotatable relative to one another in pairs within defined limits of relative angular displacement. Such rotation occurs against circumferentially acting elastic members operative between them over part at least of such relative angular displacement. A first coaxial part comprises a hub. A second coaxial part comprises at least one transverse annular hub flange around the hub. First teeth with clearance are disposed between the hub and the hub flange. A third coaxial part comprises at least one transverse annular flange around but having no direct relationship with the hub, parallel to the hub flange. The second part further comprises at least one transverse annular auxiliary flange around the hub, parallel to and associated with the hub flange. Second teeth with clearance are disposed between the auxiliary flange and the hub. The first and second teeth are in an alternating arrangement, the overall arrangement of the device being such that for a first circumferential direction of relative angular displacement between the first and second parts the hub flange becomes operative first, whereas for the opposite circumferential direction of relative angular displacement the auxiliary flange becomes operative first.

13 Claims, 18 Drawing Figures

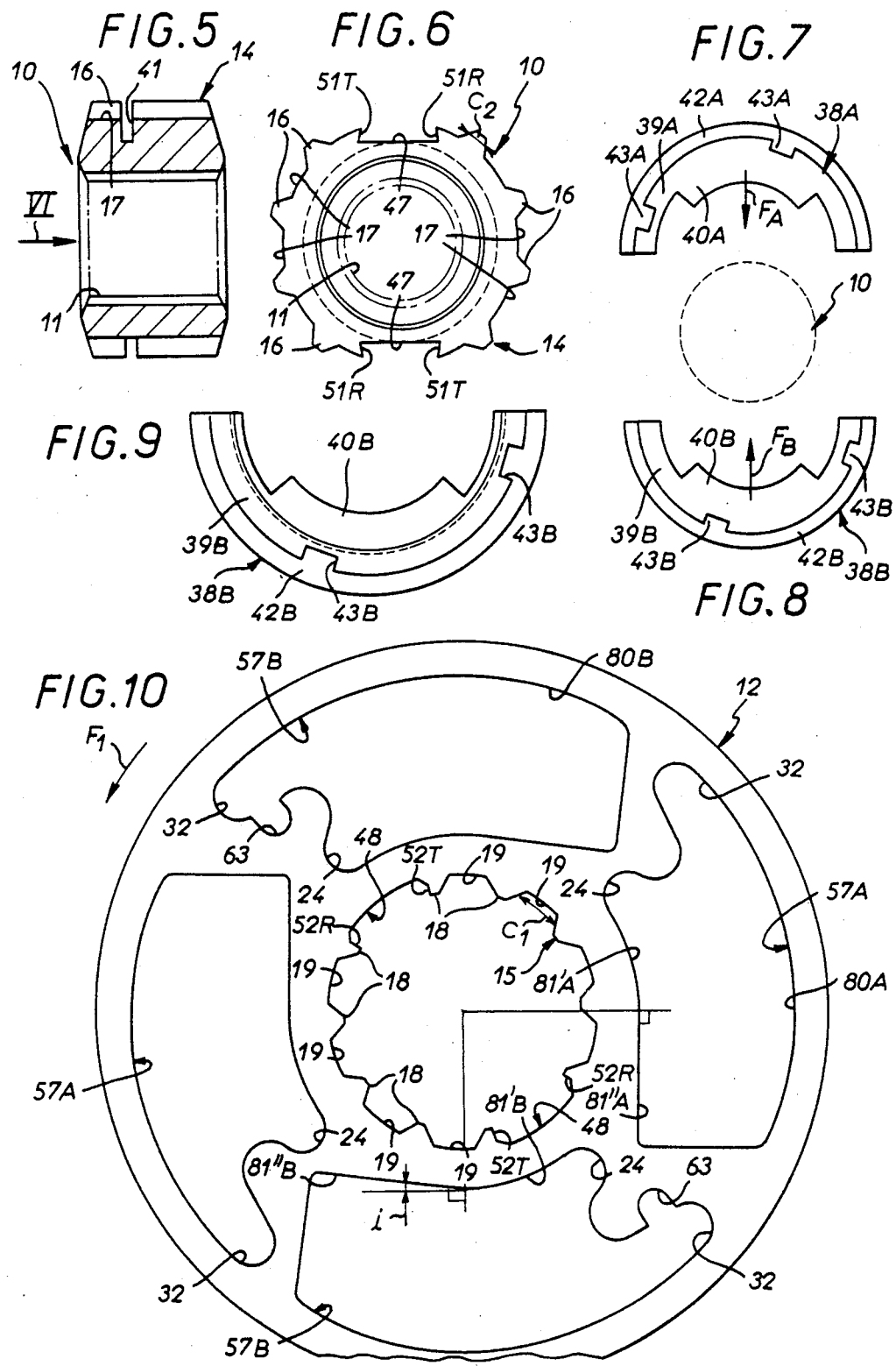

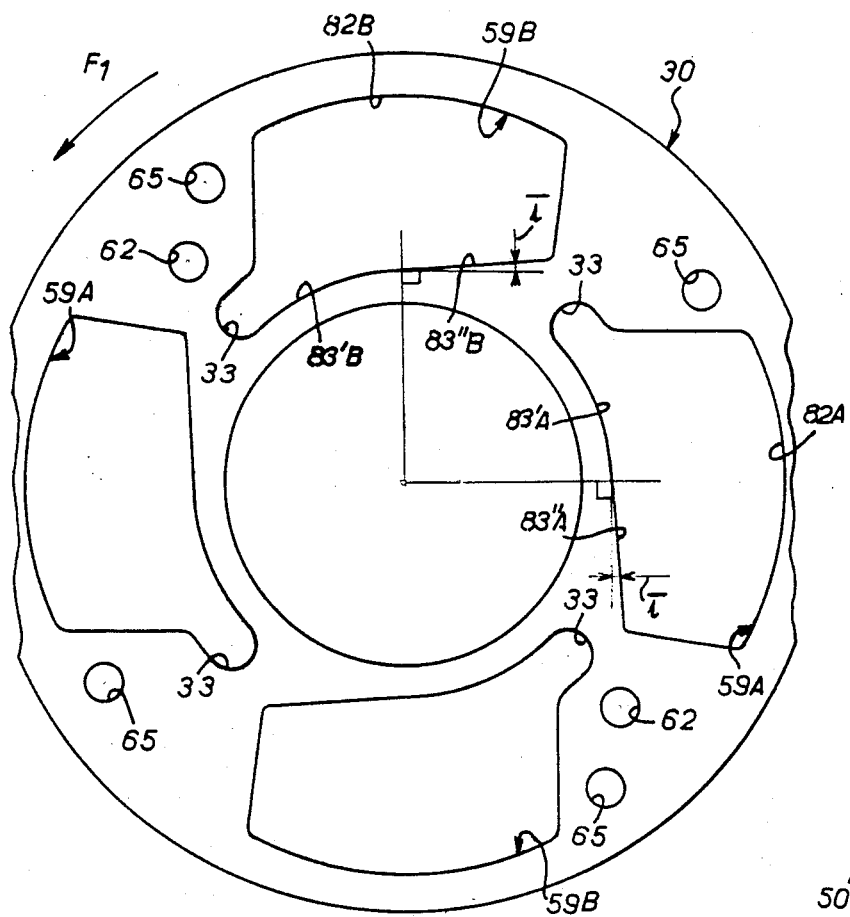
FIG.11
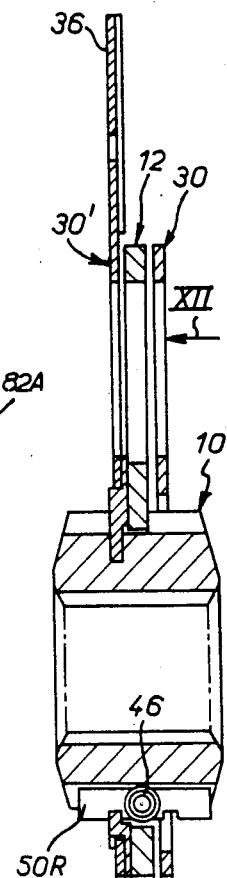
FIG.13
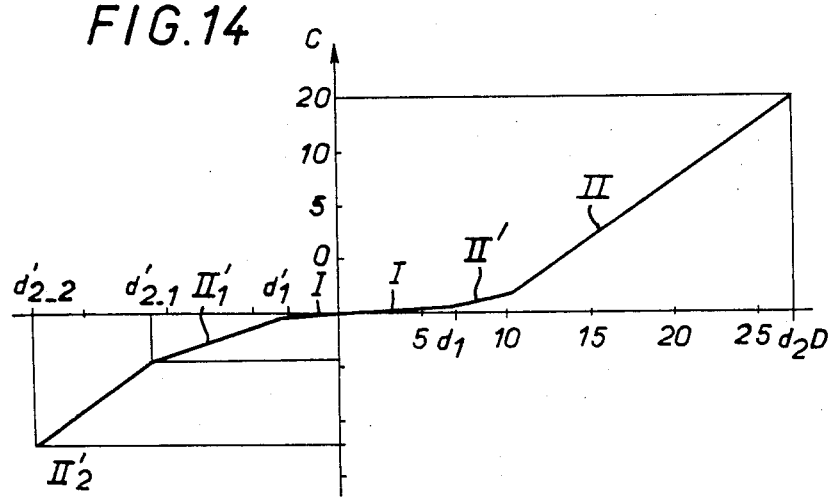
FIG.14
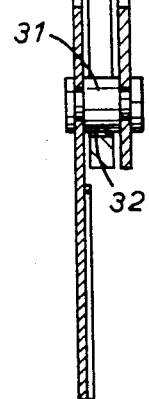

TORSIONAL DAMPER DEVICE

BACKGROUND OF THE INVENTION

1. Field of the Invention

The present invention is generally concerned with torsional damper devices comprising at least two coaxial parts disposed to rotate relative to one another within defined limits of relative angular displacement against elastic means, commonly called circumferentially acting elastic means, adapted to be operative circumferentially between them for part at least of such relative angular displacement.

2. Description of the Prior Art

As is known, this type torsional damper device is normally incorporated in the design of a clutch disk, particularly for automobile vehicles, in which case one of its rotary parts carries a friction disk designed to be constrained to rotate with a first shaft, in practice a driving shaft and the motor output shaft in the case of an automobile vehicle, whereas another comprises a hub through which it is adapted to be constrained to rotate with a second shaft, in practice a driven shaft and the gearbox input shaft in the case of an automobile vehicle.

A device of this kind is used to permit regulated transmission of rotational torque applied to one of its rotary parts where the other is itself subject to a rotational torque, that is to say, to filter vibrations which may arise at any point in the kinematic system in which it is incorporated, extending from the motor to the driven road wheels in the case of an automobile vehicle.

The present invention is more particularly directed to the case where at least three coaxial parts are employed in the construction of a torsional damper device of this kind, namely, in the direction from the axis of the device to its periphery, a first part comprising a hub, being the part designed to be constrained to rotate with the gearbox input shaft in the case of an automobile vehicle, a second part comprising at least one flange, commonly called the hub flange, forming a transverse annular part around said hub with, between it and the hub, meshing means implemented with clearance, and a third part also comprising at least one flange which, like the hub flange, to which it is parallel, forms a transverse annular part around the hub, but without any direct relationship therewith, this third part being that carrying the friction disk in the case of an automobile vehicle.

In practice this third part comprises two flanges parallel to and axially spaced from one another, one on each side of the hub flange, coupled together by axial spacers passing through openings formed in the hub flange for this purpose.

These flanges, which are the outermost flanges in the axial sense in the resulting torsional damper device, are commonly called "guide rings" since the circumferentially acting elastic means disposed between the third coaxial part of which they form part and the second coaxial part, in this instance the hub flange, intermediate the third coaxial part and the first coaxial part, comprise circumferentially distributed elastic members which they retain or, in other words guide, featuring openings in which the elastic members are individually and at least partially accommodated.

One problem to be solved in producing three-part torsional damper devices of this kind results from the necessity to reconcile two apparently contradictory requirements.

The first of these requirements relates to the fact that to minimize or even reduce certain sources of noise, more precisely the noise commonly called "trash" noise arising, for example, when the driver of the vehicle concerned depresses or releases the accelerator pedal and resulting from gears in the gearbox of the vehicle impacting on one another under load, it appears desirable, as is confirmed by experience, that the circumferentially acting elastic means disposed between the second and third coaxial parts of a torsional damper device of this kind feature a relatively low stiffness, in practice of not more than 1 m.daN per degree.

As a corollary to this, a second requirement which normally has to be met, and which is in this instance imperative, that at the end of angular displacement between said second and third parts, and thus, taking an overall view, between the first and the third parts, the maximum permissible torque is greater than the most usual maximum motor torque values.

These are frequently of the order of 15 to 17 m.daN.

For safety reasons, it is therefore desirable that the maximum torque that can be transmitted between the first and third coaxial parts of a torsional damper device of the kind in question should be of the order of 20 m.daN, for example.

In torsional damper devices of the kind in question known at present, the maximum angular displacement possible between the second and third coaxial parts is limited.

The limitation as to this angular displacement is embodied in the circumferential extent that can be given to the openings formed in the hub flange constituting the second part for the axial spacers coupling together the two flanges or guide rings constituting the first part to pass through.

Beyond a certain circumferential dimensions, these openings inevitably reduce to an unacceptable degree the mechanical strength of the hub flange, compromising the service life of the device.

In practice, in torsional damper devices of the kind in question known at present, the angular displacement between the second and third coaxial parts is more often than not 10 degrees of less.

Thus if, in order to minimize "trash" noise, there are employed between these second and third parts circumferentially acting elastic means having only moderate stiffness, of the order of 1 m.daN per degree, for example, as indicated above, the maximum permissible torque at the end of angular displacement of the device, ignoring that due to the circumferentially acting elastic means disposed between the first and second parts (which is very small, these circumferentially acting elastic means themselves having only a relatively low stiffness for other reasons, specifically to filter so-called neutral or idling noise), is at most of the order of 10 m.daN, which is insufficient.

A general object of the present invention is an arrangement whereby this difficulty may be overcome and hence the contradictory requirements reconciled.

SUMMARY OF THE INVENTION

The present invention consists in a torsional damper device comprising at least three coaxial parts disposed to rotate relative to one another in pairs within defined limits of relative angular displacement against circumferentially acting elastic means operative circumferentially between them over part at least of such relative angular displacement, wherein a first of said coaxial parts comprises a hub, a second of said coaxial parts comprises at least one transverse annular hub flange around said hub, said device further comprises first meshing means implemented with clearance, disposed between said hub and said at least one hub flange, a third of said coaxial parts comprises at least one transverse annular flange around but having no direct relationship with said hub, parallel to said at least one hub flange, said second part further comprises at least one transverse annular auxiliary flange around said hub, parallel to and associated with said at least one hub flange, said device further comprises second meshing means implemented with clearance, disposed between said at least one auxiliary flange and said hub, and said first and second meshing means are in alternating arrangement, the overall arrangement of the device being such that for a first circumferential direction of relative angular displacement between said first and second parts said at least one hub flange is operative first whereas for the opposite circumferential direction of relative angular displacement said at least one auxiliary flange is operative first.

In one embodiment the first meshing means comprise conjugate toothed portions on said hub and said at least one hub flange, said second meshing means comprise conjugate toothed portions on said hub and said at least one auxiliary flange, one at least of said toothed portions has at least one tooth parallel to the axis of the device, the other has a groove engaged over said at least one tooth whereby it cooperates with said at least one tooth, the circumferential extent of said groove is greater than that of said at least one tooth, in an inoperative configuration of the device as defined by the circumferentially acting elastic means disposed between the two parts concerned and for a first circumferential direction the circumferential clearance between said conjugate toothed portions on said hub and said at least one hub flange is greater than that for said first circumferential direction between said conjugate toothed portions on said hub and said at least one auxiliary flange, whereas for the opposite circumferential direction the circumferential clearance between said conjugate toothed portions on said hub and said at least one hub flange is less than that for said opposite circumferential direction between said conjugate toothed portions on said hub and said at least one auxiliary flange.

In this way the second coaxial part of the torsional damper device in question is, in accordance with the invention, divided into two separate parts, namely the hub flange and the auxiliary flange, which are not coupled together in any way and one of which is operative first in a first circumferential direction whereas the other is operative first in the opposite circumferential direction, so that it is advantageously possible to distribute between these two parts the overall displacement to be provided between this second part and the third. Other things being equal, especially with regard to mechanical conditions, it is possible to obtain between second and third parts a maximum angular displacement significantly greater than that normally permissible in torsional damper devices of the kind in question known at present.

In practice, by virtue of the arrangement in accordance with the invention this angular displacement may easily be of the order of 20 degrees, for example.

The advantageous result is that it is then possible to employ between the second and third parts of the torsional damper device concerned circumferentially acting elastic means of only moderate stiffness, of the order of 1 m.daN per degree, for example, desirable for the reasons already indicated, whilst being able to filter neutral or idling noise.

Other objects and advantages will appear from the following description of an example of the invention, when considered in conjunction with the accompanying drawings, and the novel features will be particularly pointed out in the appended claims.

BRIEF DESCRIPTION OF THE DRAWINGS

FIG. 5 is a view in axial cross-section of the hub which the torsional damper device in accordance with the invention comprises, shown in isolation.

FIG. 6 is a view in elevation of this hub as seen in the direction of the arrow VI in FIG. 5.

FIG. 7 shows to a reduced scale one of the component parts of a bearing employed in the torsional damper device in accordance with the invention, shown in isolation.

FIG. 8 is a view in elevation of the other of said component parts of this bearing, to the same scale as FIG. 7.

FIG. 9 is a view repeating that of FIG. 8 to a larger scale.

FIG. 10 is a partial view in elevation to the same scale as FIG. 1 of one of the flanges used in the torsional damper device in accordance with the invention.

FIG. 11 is likewise a partial view in elevation of another of these flanges.

FIG. 13 is a view of this sub-assembly in axial cross-section on the broken line XIII—XIII in FIG. 12.

FIG. 14 is a diagram illustrating the operation of the torsional damper device in accordance with the invention.

DESCRIPTION OF THE PREFERRED EMBODIMENT

The figures illustrate, by way of example, the application of the invention to a clutch disk, especially for automobile vehicles.

Generally speaking, the torsional damper device which constitutes this clutch disk comprises three coaxial parts A, B and C disposed to rotate relative to one another in pairs within defined limits of angular displacement against elastic means, commonly called circumferentially acting elastic means, adapted to be operative circumferentially between them over part at least of such angular displacement.

The first part A consists of a simple hub 10 designed to be constrained to rotate with a shaft (not shown), in practice the input shaft of the gearbox of the vehicle concerned, forming the driven shaft.

To this end the internal bore 11 in the hub 10 is splined, for example and as shown schematically here.

The second part B comprises, in a manner known per se, a flange 12 commonly called the hub flange forming a transverse annular part around the hub 10, with meshing means 13 implemented with clearance disposed between it and said hub 10.

This hub flange 12 is shown in isolation in FIG. 10.

Figure 4:
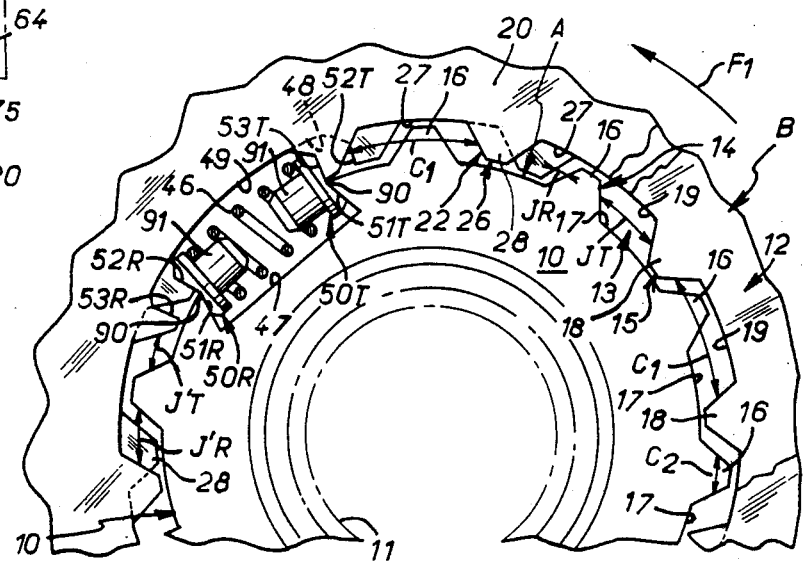
FIG. 4 shows, to the same scale as FIG. 3 and partially cut away, the detail of FIG. 1 marked by the box IV thereon.

As is best seen in FIG. 4, the meshing means 13 with clearance disposed between the hub 10 and the hub flange 11 comprise two toothed portions 14 and 15, hereinafter referred to for convenience as conjugate toothed portions, one (14) on the hub 10, more precisely on the outside periphery thereof, and the other (15) on said hub flange 12, more precisely on the edge of the inside periphery thereof.

At least one of the toothed portions of these conjugate toothed portions 14, 15 features at least one tooth parallel to the axis of the device whereas the other features, for purposes of cooperation with this tooth, a groove by means of which it is engaged over said tooth and the circumferential extent of which is greater than that of the tooth.

In practice, the toothed portion 14 on the hub 10 thus features a plurality of teeth 16 regularly distributed in the circumferential direction and alternating with grooves 17; as a corollary to this, the toothed portion 15 on the hub flange 12 comprises a plurality of teeth 18 regularly distributed in the circumferential direction and alternating with grooves 19.

The teeth 16 of the toothed portion 14 on the hub 10 are engaged in the grooves 19 of the toothed portion 15 on the hub flange 12 and, as a corollary to this, the teeth 18 of said toothed portion 15 are engaged in the grooves 17 of said toothed portion 14.

In practice, as measured along a common circumference passing, for example, through the mid-height of the teeth 16 of the toothed portion 14 on the hub 10, the circumferential extent C1 of the grooves 19 of the toothed portion 15 on the hub flange 12 is greater than that C2 of said teeth 16 of the toothed portion 14 on the hub 10.

In the embodiments shown, and for reasons which will emerge hereinafter, the toothed portion 14 on the hub 10 extends axially over the full length thereof.

Likewise, the toothed portion 15 on the hub flange 12 extends over the entire axial length of its edge.

In accordance with the invention, the part B further comprises at least one further flange 20, referred to hereinafter for convenience as the auxiliary flange, which, like the hub flange 12 with which it is associated and to which it is parallel, forms a transverse annular part around the hub 10, with meshing means 22 implemented with clearance disposed between it and the latter.

In the embodiments shown, there are therefore two auxiliary flanges 20 parallel to and axially spaced from one another, one on each side of the hub flange 12, coupled to one another by axial spacers 23 passing through holes 24 formed in the hub flange for this purpose.

In practice four spacers 23 are provided in this way, in pairs at substantially 90 degrees to one another, with the same number of openings 24 in the hub flange 12.

Each of these axial spacers 23 is crimped at its ends to the auxiliary flanges 20 which it couples together.

In the embodiments shown the auxiliary flanges 20 are each thinner than the hub flange 12 which, in practice a pressed steel part, is of the usual thickness.

The meshing means 22 with clearance disposed between the hub 20 and the auxiliary flanges 20 are in corresponding axial relationship on the two auxiliary flanges 20.

For each of these auxiliary flanges 20 they comprise two conjugate toothed portions, one on the hub 10 and the other on an auxiliary flange 20.

In practice the toothed portion 14 on the hub 10 extends axially over the entire length thereof and is common to the hub flange 12 and to the auxiliary flange 20.

In other words, the hub 10 comprises a single toothed portion 14 for cooperation with the hub flange 12 and with the auxiliary flanges 20.

As with the hub flange 12, the conjugate toothed portion 26 of the auxiliary flanges 20 is formed at the inside periphery of these auxiliary flanges 20, as by cutting, for example, extending in practice over the full axial length of the edge of the latter.

A toothed portion 26 of this kind features at least one groove 27 parallel to the axis of the device through which it is engaged with clearance over a tooth 16 of the toothed portion 14 on the hub 10.

In practice a toothed portion 26 of this kind comprises a plurality of such grooves 27, regularly distributed in the circumferential direction and alternating with the teeth 28, the arrangements being similar to those previously described in relation to the hub flange 12.

In practice, in the embodiments shown, the respective toothed portions 15 and 26 on the hub flange 12 and auxiliary flanges 20 are adapted to be superposed on one another, as seen in plan view.

In other views, in this embodiment, the circumferential extent of each groove 27 of the toothed portion 26 of an auxiliary flange 20 is equal to the circumferential extent C1 of the grooves 19 of the toothed portion 15 on the hub flange 12 and, as measured under the same conditions, as explained above, it is therefore greater than that C2 of the teeth 16 of the toothed portion 14 on the hub 10.

The third part C also comprises at least one flange 30 which, like the hub flange 12 to which it is parallel, forms a transverse annular part around the hub 10 but which, unlike the hub flange 12 and thus the auxiliary flanges 20, has no direct relationship with the hub 10, that is to say there are no meshing means with clearance disposed between it and the latter.

This flange 30 is shown in isolation in FIG. 11.

In the embodiment shown the part C comprises two flanges 30, 30' parallel to and axially spaced from one another, one on each side of the hub flange 12, coupled together by axial spacers 31 passing through openings 32 formed for this purpose in said hub flange 12.

In practice there are four axial spacers 31 disposed in pairs at substantially 90° to one another, with the same number of openings 32 in the hub flange 12.

In the embodiment shown the axial spacers 31 are disposed on a circumference with a greater diameter than the circumference on which are disposed the axial spacers 23 coupling together the two auxiliary flanges 20.

In the embodiment shown, the flanges 30, 30' are placed in the immediate vicinity of the hub flange 12, the auxiliary flanges 20 being themselves disposed one on each side of the combination consisting of the hub flange 12 and the flanges 30, 30'.

In other words, in this embodiment the auxiliary flanges 20 in accordance with the invention are the outermost flanges in the axial sense of the torsional damper device concerned.

As a result, as for the hub flange 12, the axial spacers 23 which couple them to one another pass through openings 33 formed in the flanges 30, 30' for this purpose.

The part C further comprises a friction disk 34.

In the embodiment shown, the flange of the friction disk is formed directly by the previously described flange 30', which constitutes beyond the periphery of the hub flange 12, the auxiliary flanges 20 and the flange 30 with which it is associated, sectors 36 with friction facings 35 attached to each side thereof.

By clamping these friction facings 35 between two plates, namely a pressure plate and a reaction plate (not shown), the part C may be constrained to rotate with a shaft.

In practice this is a driving shaft.

In the case of a clutch disk for automobile vehicles, it is the output shaft of the motor of the vehicle.

For centering the part C relative to the part A a bearing 37 is radially inserted between one of the flanges 30, 30' of this part C and the hub 10 constituting the part A.

In the embodiment shown, the bearing 37 is dispose between the inside periphery of the flange 30' and the hub 10.

In this embodiment, it consists of two separate parts 38A, 38B each of which extends over 180° and which mate together on a diametral plane of the device.

The two parts 38A, 38B thus constituting the bearing 37 are shown in isolation in FIGS. 7 and 8, respectively.

Each comprises a half-ring 39A, 39B which, at its inside periphery and at one axial end, features circumferentially over part at least of its length, and in practice in the embodiment shown over part only thereof, a tab 40A, 40B which projects radially towards the axis of the device and by means of which they are individually and conjointly engaged in a common annular transverse groove 41 formed for this purpose in the outside periphery of the hub 10.

In practice, to achieve the required centering of the part C relative to the part A, that is to say of the flanges 30, 30' relative to the hub 10, the inside edge of this tab 40A, 40B is able to cooperate with the bottom of the groove 41 in the hub 10 in which it is engaged.

At its outside periphery the ring 39A, 39B of each of the parts 38A, 38B constituting the bearing 37 features over its full circumference, at the opposite axial end, a collar 42A, 42B which projects radially away from the axis of the device and which is inserted between the flange 30' of the part C and the hub flange 12 of the part B.

In the embodiment shown this collar 42A, 42B is thinner than the associated tab 40A, 40B, which itself is thinner than the main part of the corresponding ring 39A, 39B, and is axially offset relative to said tab 40A, 40B.

In other words, in this embodiment, the collar 42A, 42B on each of the parts 38A, 38B constituting the bearing 37 extends in a transverse plane different to that in which its tab 40A, 40B extends.

Figure 3:
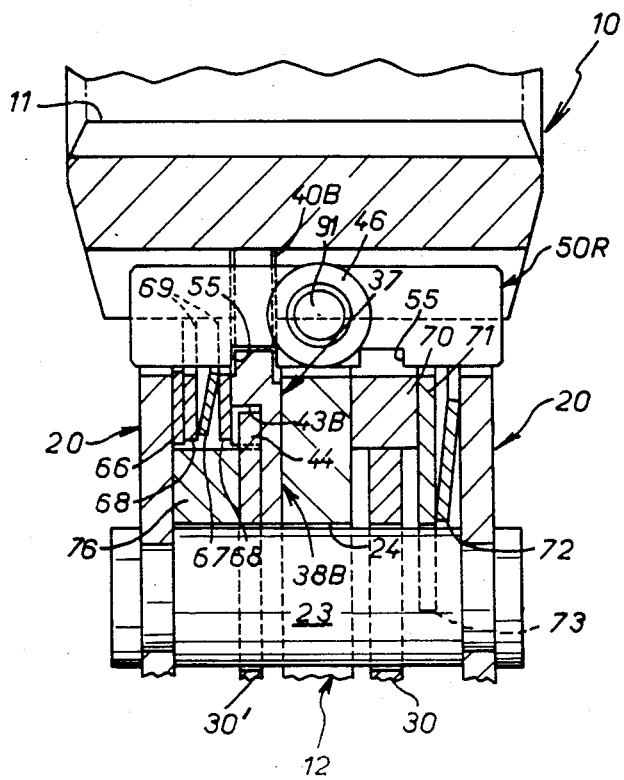
FIG. 3 shows to a larger scale the detail of FIG. 2 marked by the box III thereon.

Finally, the ring 39A, 39B of each of the parts 38A, 38B constituting the bearing 17 features at its outside periphery spaced notches 43A, 43B into which penetrate radially, in order to constrain the device to rotate with the part C, teeth 44 projecting radially to this end towards the axis of the device from the inside periphery of the flange 30' forming part of this part C (FIG. 3).

The circumferentially acting elastic means disposed between the part A and the part B comprise, in the embodiments shown, at least one coil spring 46 which, disposed substantially tangentially relative to a circumference of the device, is accommodated in part in a notch 47 constituting a local interruption of the toothed portion 14 on the hub 10, being deeper than the latter, and in part in notches 48, 49 constituting local interruptions of the toothed portion 15 on the hub flange 12 and that 22 on the auxiliary flanges 20. In the embodiments shown there are thus provided between the parts A and B two springs 46 in substantially diametrically opposite positions relative to one another.

The hub 10 therefore features two notches 47 and the hub flange 12 and the auxiliary flanges 20 likewise each feature two notches 48 and 49.

In practice the springs 46 employed are of relatively low stiffness, for filtering so-called neutral or idling noise.

In the embodiment shown, and as is best seen in FIG. 6, the bottom of the groove 41 in the hub 10 extends along a circle tangential to the bottom of its notches 47.

Between each of the springs 46, on the one hand, and the hub 10, the hub flange 12 and the auxiliary flanges 20, on the other hand, there is circumferentially disposed, for each circumferential direction, a respective bar 50T, 50R of which the first, the bar 50T, is disposed on the upstream side in the circumferential direction which, as shown by an arrow F1 on the figures, corresponds to the normal direction of rotation of the device, and the second of which, the bar 50R, is to the contrary disposed on the downstream side in the circumferential direction in question.

Each of the bars 50T, 50R used in this way extends axially over a distance at least equal to that separating an auxiliary flange 20 from the hub flange 12 and, in practice, over a distance at least equal to that separating the two auxiliary flanges 20 from one another.

A bar 50T, 50R of this kind is in continuous bearing engagement against a shoulder 51T, 51R on the hub 10, formed in practice by the corresponding circumferential end edge of the corresponding notch 47 in the latter.

Furthermore, and as will emerge hereinafter, it is adapted to bear selectively on a shoulder 52T, 52R on the hub flange 12 and on a shoulder 53T, 53R on the auxiliary flanges 20, these shoulders being formed, as previously, by the corresponding circumferential end edges of the corresponding notches 48 and 49 of the hub flange 12 and the auxiliary flanges 20.

To this end each of the bars 59T, 50R features in its back a V-shaped depression 90 while, for centering the spring 46 which bears on it, it comprises a projecting peg 91, as described in French patent No. 2 270 491 of Feb. 21, 1977.

For the purpose of retaining it axially, each of the bars 50T, 50R has along its axial edge radially farthest from the axis of the device a notch 55 through which it is engaged on the bearing 37, more precisely the corresponding part 38A, 38B thereof.

In practice, a bearing 37 of this kind being axially spaced from the median transverse plane of the device, which passes through the axes of the springs 46, each of the bars 50T, 50R has two identical notches 55 disposed one on each side of this median transverse plane, in symmetrical relationship to the peg 91 which it comprises, to enable it to be positioned in either axial sense in the device, only one of said notches 55 being used for this purpose after it is so fitted.

As will have been understood, it is by virtue of the spaces left circumferentially between the tabs 40A, 40B of the two parts 38A, 38B constituting the bearing 37 that provision is made for accommodating the combination formed by the bars 50T, 50R and the springs 46, the circumferential length of said tabs 40A, 40B being specifically reduced to this end in this embodiment.

For preference there is a slight circumferential clearance between each of the bars 50T, 50R and the corresponding circumferential end of the tab 40A, 40B concerned.

In the embodiment shown, the circumferentially acting elastic means disposed circumferentially between the part B and the part C comprise a plurality of elastic members 56A, 56B regularly distributed in the circumferential direction and all substantially tangential to a common circumference of the device.

In practice, in this embodiment, there are thus two elastic members 56A and, alternating with them, two elastic members 56B, each of said elastic members 56A and 56B consisting of two coaxial coil springs 56'A, 56"A and 56'B, 56"'B.

In the embodiment shown these elastic members 56A, 56B are all identical and have a higher stiffness than the aforementioned springs 46, the stiffness of which is relatively low.

Each is at least partially accommodated, on the one hand, in an opening 57A, 57B in the hub flange 12 and in openings 58A, 58B in the auxiliary flanges 20, formed in practice by holes in said hub flange 12 and said auxiliary flanges 20, and, on the other hand, in openings 59A, 59B in the flanges 30, 30', also formed in practice by holes in the latter.

In the embodiment shown, the radially outermost radial or peripheral edge 80A, 80B of the openings 57A, 57B which the hub flange 12 thus features have a circular contour centered on the axis of the device (FIG. 10).

On the other hand, their radially innermost radial or peripheral edge is formed by, in succession, a circular contour portion 81'A, 81'B centered on the axis of the device and rectilinear portion 81"A, 81"B in the circumferential direction opposite that which, as indicated by the arrow F1 in FIG. 10, corresponds to the normal direction of rotation of the device; in the case of an opening 57A, the rectilinear portion 81"A extends along the tangent to the point at which it merges with the circular contour portion 81'A, whereas in the case of an opening 57B, the rectilinear portion 81"B is at an angle i to the tangent at the point where it merges with the circular contour portion 81"B, extending radially between the latter and the axis of the device.

In practice said portions 81'A, 81"A, on the one hand, and 81'B, 81"B, on the other hand, merge with one another in substantially the median area of the openings 57A, 57B concerned.

As a corollary to this, in this embodiment although, as previously the radially outermost radial or peripheral edge 82A, 82B of the openings 59A, 59B in the flanges 30, 30' has a circular contour, this is not centered on the axis of the device but on a point situated between its median area and the latter (FIG. 11) and therefore has a smaller radius.

Moreover, in the case of these openings 59A, 59B, all of which are identical, the radially innermost radial or peripheral edge is formed by, in succession, in the circumferential directing opposite that which, as shown by the arrow F1 in FIG. 11, corresponds to the normal direction of rotation of the device, a circular contour portion 83'A, 83'B centered on the axis of the device and a rectilinear portion 83"A, 83"B which is at an angle i to the tangent at the point where it merges with the circular contour portion 83'A, 83'B extending radially beyond said tangent relative to said axis.

These arrangements favour good working conditions for the elastic members 56A, 56B and minimum reduction in the mechanical strength of the hub flange 12 and the flanges 30, 30'.

In the embodiment shown, the openings 57A, 58A, 59A accommodating the elastic members 56A are all of the same circumferential extent.

Figure 1:
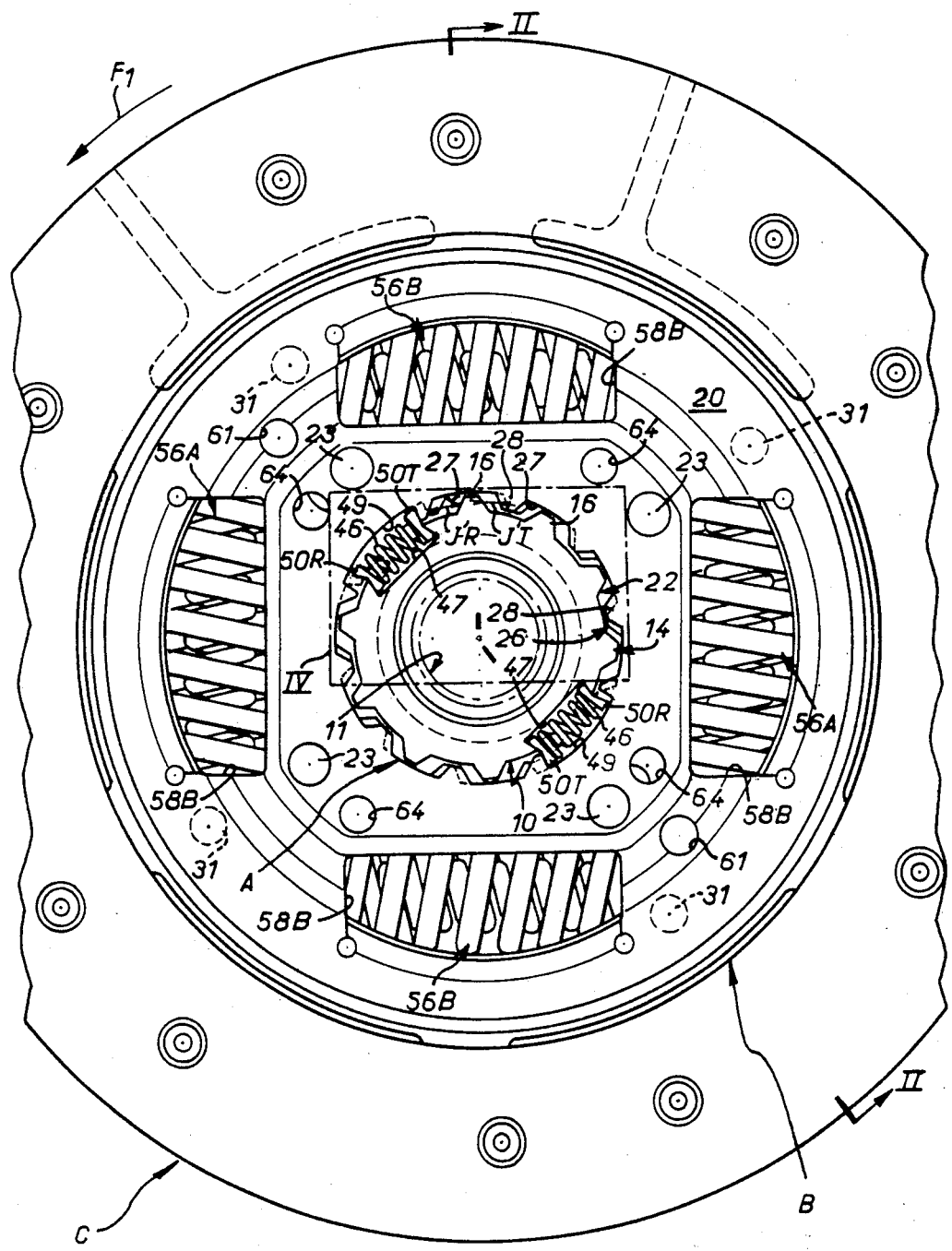
FIG. 1 is a partial view in elevation of a torsional damper device in accordance with the invention as seen in the direction of the arrow I in FIG. 2.

For the inoperative configuration of the device, as shown in FIG. 1, they are all in axial alignment with one another, at both their circumferential end edges.

On the other hand, in the case of the elastic members 56B, the openings 57B and 58B in the hub flange 12 and the auxiliary flanges 20 respectively have a greater circumferential extent than the circumferential openings 59B in the flanges 30, 30'.

Figure 12:
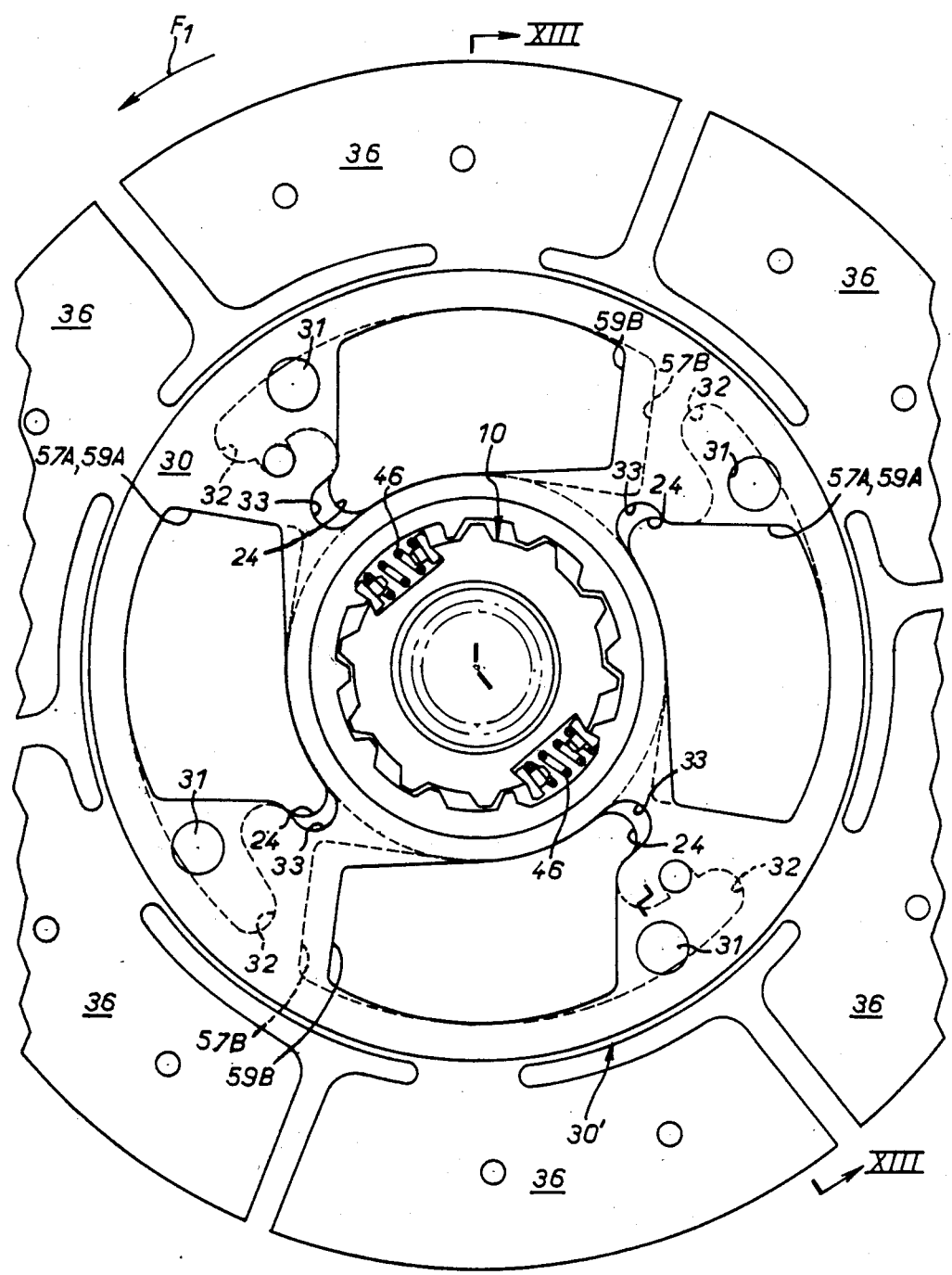
FIG. 12 is a partial view in elevation of a sub-assembly forming part of the torsional damper device in accordance with the invention as seen in the direction of the arrow XII in FIG. 13.

For the inoperative configuration of the device, and as is best seen in FIG. 12, the circumferential end edges of said openings 57B, and 59B which are on the downstream side in the circumferential direction which, as shown by the arrow F1 in FIG. 12, corresponds to the normal direction of rotation of the device, are in axial alignment with one another, as previously; on the other hand, the circumferential end edge of the openings 57B in the hub flange 12 which is on the upstream side in the circumferential direction in question is circumferentially offset towards the upstream side relative to the corresponding circumferential edge of the openings 59B in the flanges 30, 30', and the same applies to the corresponding circumferential end edge of the openings 58B in the auxiliary flanges 20.

Be this as it may, it will be noted that the auxiliary flanges 20 forming the axially outermost flanges of the torsional damper device in accordance with the invention and featuring the openings 58A, 58B in which are individually and at least partially accommodated the elastic members 56A, 56B constituting the circumferentially acting elastic means disposed between the part B and part C, constitute, in the case of these elastic members 56A, 56B, what are usually called "guide rings", one at least of the radial end edges of their openings 58A, 58B, that which is radially outermost, for example, being advantageously louver-shaped to this end, as shown here.

Figure 2:
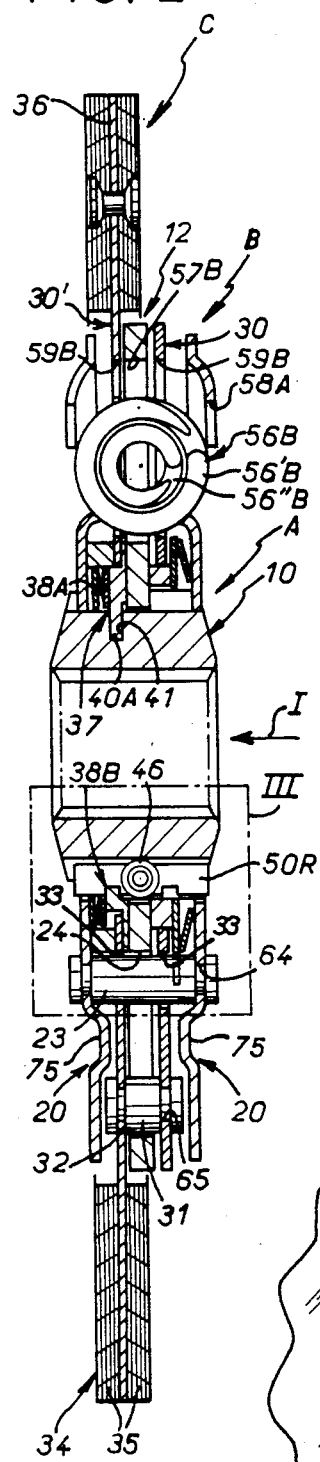
FIG. 2 is a view of it in axial cross-section on the broken line II—II in FIG. 1.

Furthermore, to offer good bearing engagement to the elastic members 56A, 56B, each of the auxiliary flanges 20 features an annular stamped portion 75 in the area of the openings 58A, 58B projecting axially inwards (FIG. 2).

The axial thickness of the device is comensurately reduced in this area.

This arrangement favours the use of existing springs to constitute the elastic members 56A, 56B; it also and advantageously contributes to a reinforcement of the stiffness of the auxiliary flanges 20, 20'.

Moreover, in the embodiment shown, the openings 24 provided in the hub flange 12 for the axial spacers 23 to pass through form circumferential extensions of the openings 57A, 57B also provided in the hub flange 12 for the elastic members 56A, 56B.

In practice all the circumferential extensions extend in the same circumferential direction, that corresponding to the normal direction of rotation of the device as shown by the arrow F1 in FIG. 12, towards the downstream side relative to this normal direction of rotation, and they extend along the radially innermost radial end edges of these openings 57A, 57B from the circumferential end of the latter concerned.

Likewise the openings 32 provided in the hub flange 12 for the axial spacers 31 to pass through form circumferential extensions of the openings 57A, 57B in the hub flange 12 and these circumferential extensions, which all extend in the same circumferential direction, the same as the previous direction, extend along the radially outermost radial end edges of the openings 57A, 57B from the circumferential end of the latter concerned.

In the embodiment shown, marker holes 61, 62 being provided in the auxiliary flanges 20 and in the flanges 30, 30', there correspond to these holes 61, 62 in the hub flange 12 notches 63 opening along the radially innermost radial end edges of the circumferential extensions 32 in the hub flange 12.

As a corollary to this, the openings 33 provided in the flanges 30, 30' for the axial spacers 23 to pass through form circumferential extensions of the openings 59A, 59B provided in the same flanges 30, 30' for the elastic members 56A, 56B and these circumferential extensions, which all extend in the same circumferential direction, being the normal direction of rotation of the device as shown by the arrow F1 in FIG. 11, as previously, extend along the radially innermost radial end edges of these openings 59A, 59B from the circumferential end of the latter concerned.

For purposes of engagement with the axial spacers 23, the auxiliary flanges 20 are naturally each formed with holes 64 adapted to have pass through them the tails of these axial spacers 23 required for crimping them.

In practice, these auxiliary flanges 20 being indentical to one another, they each have two sets of holes 64 so that they can be placed on either side of the hub flange 12.

For purposes of engagement with the axial spacers 31, the flanges 30, 30' are likewise each formed with holes 65 adapted to have pass through them the tails of these axial spacers 31 required for crimping them.

Although to some extent the centering of the auxiliary flanges 20 relative to the hub 10 may be effected by their toothed portion 26, in practice such centering is preferably achieved by the axial spacers 23, by virtue of cooperation thereof with the openings 33 in the flanges 30, 30' through which they pass, these flanges 30, 30' being themselves centered on the hub 10 by the bearing 37, as described above.

The hub flange 12 may likewise be centered by these axial spacers 23; this may also be achieved by means of the axial spacers 31.

Friction means are provided between the various parts A, B and C constituting the torsional damper device, in the manner known per se.

In the embodiment shown these comprise, apart from the bearing 37 already described, and more precisely the collars 42A, 42B of the two parts 38A, 38B constituting the same, a friction ring 66 in contact with the inside surface of that of the auxiliary flanges 20 which is on the same side of the hub flange 12 as the bearing 37, acted on by axially acting elastic means continuously urging it into bearing engagement against this auxiliary flange 20 (FIG. 3).

In practice these axially acting elastic means consist of a spring washer 67 of the Belleville washer type disposed between two distribution rings 68 disposed one in contact with the friction ring 66 and the other in contact with the bearing 37, both constrained to rotate with the hub 10 by teeth 69 interlocking with the teeth 16 of the toothed portion 14 on the hub 10.

In the embodiment shown the friction means operative between the parts A, B and C constituting the torsional damper device in accordance with the invention further comprise a friction ring 70 radially disposed at the inside periphery of the flange 30, between the latter and the hub 10.

This friction ring 70 is axially in contact, on the one hand, with the hub flange 12, and, on the other hand, with a distribution ring 71 which is in turn acted on by axially acting elastic means, in practice a Belleville spring washer 72, bearing on the adjacent auxiliary flange 20 and engaged, through fingers 73 projecting radially from its outside periphery, with at least one of the axial spacers 23, by which it is therefore constrained to rotate with the auxiliary flanges 20.

Finally, the friction means between the parts A, B and C constituting the torsional damper device in accordance with the invention comprise, in the embodiment shown, a friction ring 76 disposed axially between the flange 30' and the auxiliary flange 20 near the latter and extending radially between the axial spacers 23 and the aforementioned rings 66, 67, 68.

In the inoperative configuration of the device as shown in FIGS. 1 and 4, the springs 46 constituting the circumferentially acting elastic means disposed between the parts A and B determine for the latter a relative centering position for which there is, for a first circumferential direction corresponding, as shown by the arrow F1 in FIGS. 1 and 4, to the normal direction of rotation of the device, a circumferential clearance JT between the conjugate toothed portions 14, 15 on the hub 10 and the hub flange 12 and, for the opposite circumferential direction, a clearance JR (FIG. 4).

Likewise, in this inoperative configuration, there is for the circumferential direction shown by the arrow F1 a circumferential clearance J'T between the conjugate toothed portions 14, 26 on the hub 10 and the auxiliary flanges 20 and, for the opposite circumferential direction, a clearance J'R (FIGS. 1 and 4).

In accordance with the invention an alternating arrangement is adopted for the corresponding meshing means 13 and 22 implemented with clearance, whereby the circumferential clearance JT for the corresponding circumferential direction between the conjugate toothed portions 14, 15 on the hub 10 and the hub flange 12 is greater than that J'T for the same circumferential direction between the conjugate toothed portions 14, 26 on said hub 10 and the auxiliary flanges 20, whereas for the opposite circumferential direction the circumferential clearance JR between the conjugage toothed portions 14, 15 on the hub 10 and the hub flange 12 is, to the contrary, less than that J'R for said opposite circumferential direction between the conjugate toothed portions 14, 26 on said hub 10 and the auxiliary flanges 20.

In practice, for the inoperative configuration of the device, the bars 50T each bear on the corresponding shoulder 51T on the hub 10 and on the corresponding shoulder 53T on the auxiliary flanges 20, due to the action of the springs 46; as a corollary to this, each of the bars 50R bears on the corresponding shoulder 51R on the hub 10 and on the corresponding shoulder 52R on the hub flange 12, due to the action of the same springs 46, reflecting the alternating arrangement in accordance with the invention.

A result of the arrangement in accordance with the invention is that, as explained above, for a first circumferential direction of relative angular displacement between the part A and the part B, being that which corresponds to the normal direction of rotation of the device and corresponds also to "upshift" operation of the device, the auxiliary flanges 20 of said part B are the first to become operative, whereas for the opposite circumferential direction, which thus corresponds to "downshift" operation of the device, it is, to the contrary, the hub flange 12 of the same part B which is the first to become operative.

In operation, when torque is applied to the part C the springs 46 disposed between the part B and the part A are the first to yield, being of relatively low stiffness, everything occuring as if the part B were interlocked in the angular sense to the part C by the elastic members 56A, 56B, given the relatively high stiffness of the latter.

During the first phase of operation which begins in this way, everything occurs as if the parts C and B were turning together about the part A.

In the diagram in FIG. 14 the angular displacement D between the part C and the part A is plotted on the horizontal axis and the torque C transmitted from one of them to the other on the vertical axis. The curve I representing this first phase of operation is a straight line through the origin of relatively low slope, reflecting the relatively low stiffness of the springs 46.

Figure 15A:
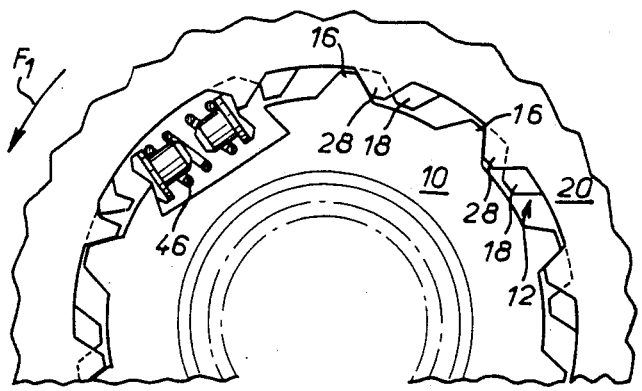
FIG. 15A, 15B, 15C and 15D are partial views in elevation showing, to the same reduced scale as FIG. 4, various successive phases of the operation of the torsional damper device in accordance with the invention.

This first phase of operation continues until, for an angular displacement d1, the springs 46 are saturated and, through the teeth 28 of their toothed portion 26, the auxiliary flanges 20 then bear positively on the teeth 16 of the toothed portion 14 on the hub 10 (FIG. 15A).

From this time, which marks the beginning of a second phase of operation, the elastic members 56A, 56B disposed between the parts C and B in turn become operative, adding their effects to those of the springs 46, which remain compressed.

In practice, given the structural arrangements described above, the elastic members 56A, 56B all become operative simultaneously for the circumferential direction concerned, which corresponds to "upshift" operation of the device, that is to say operation during which the driving torque applied to the art C is greater than the resisting torque to which the part A is subjected.

All these elastic members 56A, 56B are then progressively compressed between the points where they bear on the flanges 30, 30' of the part C and the points where they bear on the auxiliary flanges 20.

On the other hand, temporarily released in this way from any bearing engagement with the elastic members 56A, 56B, the hub flange 12 is momentarily unrestricted relative to the remainder of the device, ignoring friction forces, this being the case until the corresponding circumferential clearance JT is taken up (FIG. 15B), whereupon it comes into positive bearing engagement through the teeth 18 of its toothed portion 15, at this time axially aligned with those 28 of the auxiliary flanges 20, on the teeth 16 of the toothed portion 14 on the hub 10, so that it is again constrained to rotate with said auxiliary flanges 20.

In the diagram in FIG. 14, the curve II representing this second phase of operation is a second straight line the slope of which is significantly greater than that of the previous segment, since this slope reflects the stiffness of the elastic members 56A, 56B, to which must be added the effect of the prestressed springs 46, which remain compressed as explained above.

In practice this straight line segment II is linked to the aforementioned straight line segment I by a straight line segment II' of intermediate slope, due to slantwise action in the manner known per se of the elastic members 56A, 56B between the flanges 30, 30', on the one hand, and the auxiliary flanges 20, on the other hand.

This second phase of operation continues until, for an angular displacement d2, the part B is positively driven by the part C, either because the turns of at least one of the elastic members 56A, 56B operative between them are then contiguous, or because at least one of the axial spacers 31 has come into contact with the edge of the opening 32 in the hub flange 12 through which it passes.

In the latter case, this hub flange 12, which has not previously been operative for the circumferential direction in question, serves as an intermediate abutment between the part C, which is the driving part, and the part A, which is the driven part.

In this way the excess torque is transmitted through the axial spacers 31.

The arrangement is such that, by virtue of the openings 24 in the hub flange 12 and those 33 in the flanges 30, 30', the axial spacers 23 do not become operative, said openings 33 in the flanges 30, 30' having to this end a circumferential extent which is greater than that of said openings 24 in the hub flange 12.

If it is now assumed that at a specific time the torque is reversed, the driving torque applied to the part C becoming less than the resistive torque applied to the part A, a process which is the reverse of the preceding process takes place, corresponding to "downshift" operation of the device.

By virtue of a process which is the reverse of that previously described, there is initially a virtually instantaneous expansion of the elastic members 56A, 56B, everything occuring as if, while continuing naturally to turn as a whole in the same direction of rotation, the circumferential direction shown by the arrow F1 in the figures, the parts B and C are subject to a retrograde rotation relative to the part A, in the reverse circumferential direction.

After the device reverts to the inoperative configuration, this retrograde relative rotation movement continues.

During a first stage, after an angular displacement d'1, it leads to absorbtion of the circumferential clearance JR between the conjugate toothed portions 14, 15 on the hub 10 and the hub flange 12 and thus to positive bearing engagement of the hub flange 12 on the hub 10 (FIG. 15C), the springs 46 being saturated again, but in the opposite direction to that applying previously.

Thus for "downshift" operation it is the hub flange 12 which becomes operative first whereas, for "upshift" operation as previously described, it was the auxiliary flanges 20.

The curve I' representing this first phase of operation is a straight line segment through the origin aligned with the corresponding straight line segment I.

However, as distinguished from the preceding "upshift" operation, and by virtue of the structural arrangements adopted in this embodiment, during a first stage only the elastic members 56A become operative, their effects being added as previously to the effects of the prestressed springs 46, which remain compressed.

For an angular displacement d'2-1 corresponding to absorption of the circumferential offset existing between the circumferential end edges concerned of the openings 57B, 58B-59B in which they are accommodated, the elastic members 56B become operative in their turn.

The curve representing this operation is formed by straight line segments II'$_1$ and II'$_2$ in succession, the first having a slope intermediate that of the previous straight line segments I and II and the second having a slope substantially equal to that of the latter.

Figure 15B:
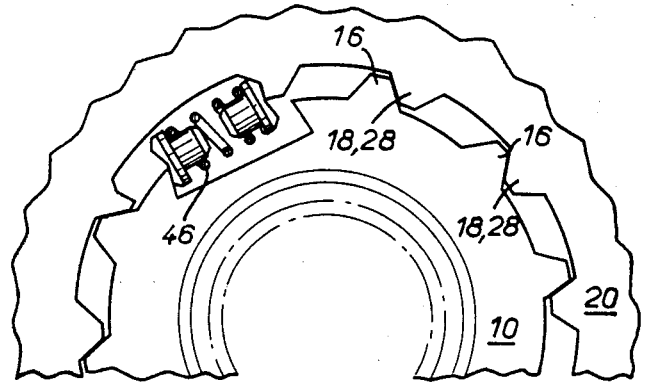
Figure 15C:
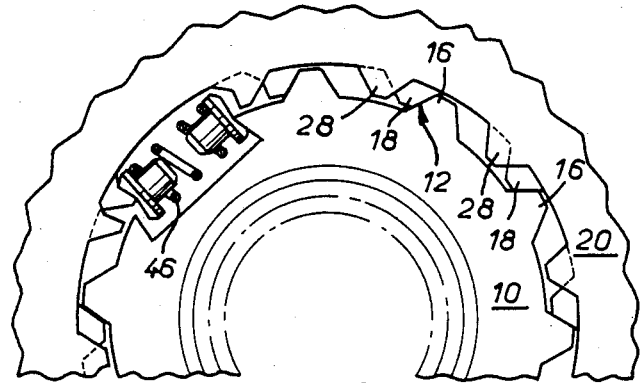
Figure 15D:
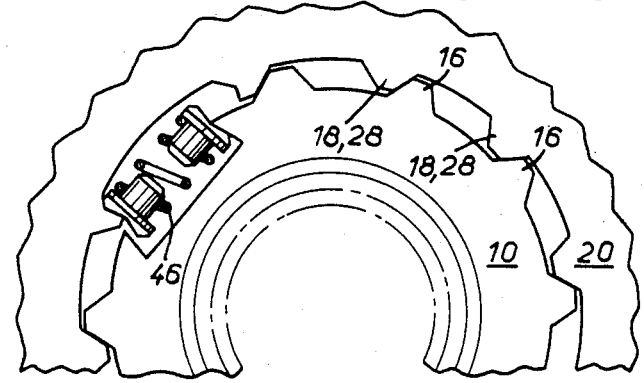

During this second phase of operation the auxiliary flanges 20 are unrestrained, neglecting friction forces, as was the hub flange 12 during the previous "upshift" operation, this being the case until, the corresponding circumferential clearance J'R being in its turn absorbed, they also come into positive bearing engagement through their teeth 28 with the teeth 16 on the hub flange 12 (FIG. 15B).

This second phase of operation continues until, for an angular displacement d'2-2, there is positive bearing engagement between the coaxial parts B and C either because, as previously, the turns of any of the elastic members 56A, 56B at least have become contiguous or because at least one of the axial spacers 23 coupling the auxiliary flanges 20 then comes into contact with the edge of the opening 33 in the flanges 30, 30' through which it passes.

In this case, as distinguished from the previous arrangements, it is therefore through the auxiliary flanges 20 that there is then obtained positive bearing engagement between the part C and the part A, the excess torque being transmitted by the axial spacers 23.

It will be noted that although, during "upshift" operation, the axial spacers 23, 31 move relative to the hub flange 12 by virtue of the specific openings 24, 32 provided to this end in the latter, during "downshift" operation they move relative to it by virtue, at least in part, of the openings 57A, 57B which are provided for the elastic members 56A, 56B.

Other things being equal, the result is that the mechanical weakening of the hub flange 12 by the openings formed in it for these axial spacers to pass through is reduced.

Alternatively, for the same mechanical strength, these openings may be of greater circumferential extent.

In other words, the angular displacement between the parts C and B may then be greater.

In practice, it may be of the order of 20°, for example, thanks to the invention, as shown in the diagram in FIG. 14, in which the angular displacement d1 is assumed to equal 7° and the angular displacement d2 to equal 27°.

It will be understood that these values are given here by way of illustrative example only, without any limiting effect as to the scope of the invention.

As will also be noted on referring to FIGS. 11 and 12, the hub 10, the hub flange 12, the flanges 30, 30' and therefore the friction disk 34 formed by the flange 30' may advantageously constitute, after fitting of the axial spacers 31 and together with the springs 46 and the corresponding bars 50T, 50R, a unitary sub-assembly adapted to be pre-assembled individually and to be handled as such, prior to fitting other components of the torsional damper device in accordance with the invention.

After such preliminary assembly, which as shown in FIGS. 7 and 8 presupposes radially offering up of the two parts 38A, 38B constituting the bearing 37 to the hub 10, in opposed radial directions schematically represented by the arrows FA and FB in FIGS. 7 and 8, the bearing 37 of itself secures axial retention of the hub flange 12 and the flanges 30, 30' relative to said hub 10, by virtue of its engagement in a transverse groove 41 in the latter and the presence of a collar 42A, 42B on said parts 38A, 38B which constitute it.

The assembly of the torsional damper device in accordance with the invention is thereby advantageously facilitated.

It will be understood that various changes in the details, materials and arrangements of parts which have been herein described and illustrated in order to explain the nature of the invention may be made by those skilled in the art within the principle and scope of the invention as expressed in the appended claims.

For example, instead of being all identical and therefore having all the same stiffness the elastic members which are operative circumferentially between the second and third parts constituting the torsional damper device in accordance with the invention may have different stiffness, individually or in groups.

Likewise, instead of having the same circumferential extent, the grooves of the toothed portions which the hub flange and the auxiliary flanges constituting in accordance with the invention said second part of a torsional damper device of this kind comprise may be of different circumferential extent.

Also, the field of application of the invention is not limited to that of the torsional damper device specifically described and shown or to clutch disks for automobile vehicles.

To the contrary it covers any type of torsional damper device comprises three parts rotatable relative to one another.

We claim:

1. Torsional damper device comprising at least three coaxial parts disposed to rotate relative to one another in pairs within defined limits of relative angular displacement against circumferentially acting elastic means operative circumferentially between them over part at least of such relative angular displacement, wherein a first of said coaxial parts comprises a hub, a second of said coaxial parts comprises at least one transverse annular hub flange around said hub, said device further comprises first meshing means implemented with clearance, disposed between said hub and said at least one hub flange, a third of said coaxial parts comprises at least one transverse annular flange around but free of meshing with said hub, parallel to said at least one hub flange, said second part further comprises at least one transverse annular auxiliary flange around said hub, parallel to and associated with said at least one hub flange, said device further comprises second meshing means implemented with clearance, disposed between said at least one auxiliary flange and said hub, and said first and second meshing means are in alternating arrangement, the overall arrangement of the device being such that for a first circumferential direction of relative angular displacement between said first and second parts said at least one hub flange is operative first whereas for the opposite circumferential direction of relative angular displacement said at least one auxiliary flange is operative first.

2. Torsional damper device according to claim 1, wherein said first meshing means comprise congugate toothed portions on said hub and said at least one hub flange, said second meshing means comprise conjugate toothed portions on said hub and said at least one auxiliary flange, one at least of said toothed portions has at least one tooth parallel to the axis of the device, the other has a groove engaged over said at least one tooth whereby it cooperates with said at least one tooth, the circumferential extent of said groove is greater than that of said at least one tooth, in an inoperative configuration of the device as defined by the circumferentially acting elastic means disposed between the two parts concerned and for a first circumferential direction the circumferential clearance between said conjugate toothed portions on said hub and said at least one hub flange is greater than that for said first circumferential direction between said conjugate toothed portions on said hub and said at least one auxiliary flange, whereas for the opposite circumferential direction the circumferential clearance between said conjugate toothed portions on said hub and said at least one hub flange is less than that for said opposite circumferential direction between said conjugate toothed portions on said hub and said at least one auxiliary flange.

3. Torsional damper device according to claim 2, wherein said toothed portions on said at least one hub flange and said at least one auxiliary flange are adapted to be superposed on one another.

4. Torsional damper device according to claim 2, wherein said toothed portion on said hub cooperates with said toothed portion on said at least one hub flange and with said toothed portion on said at least one auxiliary flange.

5. Torsional damper device according to claim 1, further comprising, circumferentially disposed between said circumferentially acting elastic means disposed between the two parts concerned and said hub, said at least one hub flange and said at least one auxiliary flange, for each circumferential direction, a respective bar extending axially over a distance at least equal to that separating said at least one auxiliary flange from said at least one hub flange, a shoulder on said hub against which said bars bear at all times and respective shoulders on said at least one hub flange and said at least one auxiliary flange against which said bars bear selectively.

6. Torsional damper device according to claim 5, wherein, in an inoperative configuration of the device, one of said bars bears on said shoulder on said hub and on said shoulder on said at least one auxiliary flange and the other of said bars bears on said shoulder on said hub and said shoulder on said at least one hub flange.

7. Torsional damper device according to claim 1, comprising two auxiliary flanges parallel to and axially spaced from one another, one on each side of said at least one hub flange, axial spacers coupling said auxiliary flanges together, and openings in said at least on hub flange through which said spacers pass.

8. Torsional damper device according to claim 7, wherein said auxiliary flanges are the outermost flanges in the axial sense and, said circumferentially acting elastic means disposed between said second and third parts comprising circumferentially distributed elastic members, they constitute guide rings for said elastic members featuring openings in which said members are individually and at least partially accommodated.

9. Torsional damper device according to claim 8, further comprising accommodation holes in said at least one hub flange in which said elastic members are partially accommodated, said accommodation holes in said at least one hub flange through which pass said spacers coupling together said auxiliary flanges constituting extensions of said accommodation holes all in the same circumferential direction.

10. Torsional damper device according to claim 9, wherein a radially innermost edge of at least one of said accommodation holes in said at least one hub flange comprises in succession a circular contour portion centered on the axis of the device and a rectilinear portion tangential to said circular contour portion at a point where it merges therewith.

11. Torsional damper device according to claim 9, wherein the radially innermost edge of at least one of said accommodation holes in said at least one hub flange comprises in succession a circular contour portion centered on the axis of the device and a rectilinear portion at an angle to the tangent to said circular contour portion at the point where it merges therewith, extending radially between said tangent and the axis of the device.

12. Torsional damper device according to claim 9, wherein said third part comprises two flanges parallel to and axially spaced from one another, one on each side of said at least on hub flange, axial spacers coupling said flanges together, and openings in said at least one hub flange through which said spacers pass and which constitute extensions, all in the same circumferential direction, of said openings in said at least one hub flange in which are partially accommodated said circumferentially acting elastic means disposed between said second and third parts.

13. Torsional damper device according to claim 12, wherein said elastic members are partially accommodated in openings in said flanges the radially innermost edge of at least one of which comprises, in succession, a circular contour portion centered on the axis of the device and a rectilinear portion at an angle to the tangent to said circular contour portion at the point where it merges therewith and extending radially beyond said tangent relative to the axis of the device.

* * * * *